United States Patent [19]

Homma et al.

[11] Patent Number: 5,647,804

[45] Date of Patent: Jul. 15, 1997

[54] SKIING SLOPE SPECIALIZED FOR ARTIFICIAL SKIS AND METHOD FOR PRODUCING THE SAME

[75] Inventors: Akira Homma; Susumu Homma; Hiroshi Sato; Hisao Hiroi, all of Tokamachi, Japan

[73] Assignee: Homma Science Co., Ltd., Tokamachi, Japan

[21] Appl. No.: 652,322

[22] Filed: May 22, 1996

[30] Foreign Application Priority Data

Mar. 30, 1996 [JP] Japan ................................. 8-104450

[51] Int. Cl.⁶ ..................................................... A63C 19/10
[52] U.S. Cl. ................................. 472/90; 472/88; 403/398
[58] Field of Search ......................... 472/90, 88; 24/114.5; 403/398, 399, DIG. 9; 428/91, 92, 88

[56] References Cited

U.S. PATENT DOCUMENTS

| 4,179,539 | 12/1979 | Schweizer | 472/90 X |
| 4,475,843 | 10/1984 | Wyler | 403/399 X |

FOREIGN PATENT DOCUMENTS

| 5329240 | 12/1993 | Japan . |
| 5329243 | 12/1993 | Japan . |
| 5329241 | 12/1993 | Japan . |
| 5329242 | 12/1993 | Japan . |
| 7222844 | 8/1995 | Japan . |
| 8141136 | 6/1996 | Japan . |

*Primary Examiner*—Kien T. Nguyen
*Attorney, Agent, or Firm*—Sughrue, Mion, Zinn, Macpeak & Seas

[57] ABSTRACT

A skiing slope is specialized for artificial skis. The slope is formed by longitudinally and laterally laying and connecting mats (1). Each mat has a predetermined area on a slanted surface (17). Each of the mats (1) has a plurality of retainer projections (2) on its rear side. At least one connector member (4) has side walls which engage with circumferential surfaces of the retainer projections (2) in a convex/concave manner. The connector member (4) is disposed between the retainer projections (2) of the mats (1). The connector member (4) is coupled with a hard longitudinal member (3) provided in the longitudinal direction of the slanted surface (17). The connector member (4) is coupled with the mats (1) under the condition that the circumferential surfaces of the retainer projections (2) and the side walls of the connector member (4) are engaged with each other in the convex/concave manner between the retainer projections (2).

16 Claims, 13 Drawing Sheets

SKIING SLOPE SPECIALIZED FOR ARTIFICIAL SKIS AND METHOD FOR PRODUCING THE SAME

BACKGROUND OF THE INVENTION

The present invention relates to a skiing area specialized for artificial skis and a method for producing the same.

The present inventors have proposed an overlay member (i.e., a mat 1) to be used to form an artificial skiing slope in Japanese Patent Application Laid-Open No. Hei 6-10082.

This mat 1 is made of synthetic resin. As shown in FIGS. 1 to 5, a plurality of retainer projections 2 are integrally connected to ribs 11 which have a lower height than that of the retainer projections 2. Male connectors 8a and female connectors 8b are provided on each side of the mat 1. The size thereof is 1 meter long and 1 meter wide. Accordingly, the mat 1 is laid for use on a desired sloped surface by coupling the plurality of male and female connectors 8a and 8b in a lateral direction and a longitudinal direction.

The present inventors have, however, discovered the following disadvantages through experiments involving the mat 1.

(1) The disadvantage is confirmed in which, when skis such as roller skis and caterpillar skis perform edging, the edging causes a force to generate a force in a fall line direction (longitudinal direction) so that the mat 1 is displaced downwardly (i.e., in the longitudinal direction). This is caused by the fact that the mat 1 is overlaid on a ground surface only by the retaining action such as an action of the retainer projections 2 to stick into the ground surface.

When the mat 1 is displaced in the fall line direction, a lower edge of the mat located downwardly is brought into contact with a final edge of the slanted surface to generate creases. Furthermore, after the force is applied in the fall line direction, the mat 1 is pushed upwardly by a reactive force from the final edge of the slanted surface so that the phenomenon occurs in which the mat 1 is lifted or raised. This lift phenomenon is transferred to the upper mat 1. Accordingly, the skiing slope becomes corrugated so that good skiing might not be possible.

(2) Since the mat 1 is made of synthetic resin, a contraction/expansion of the mat 1 due to the variation of the ambient temperature is remarkable. When the surroundings are kept at a low temperature, the mat 1 is shrunk so that tensions are applied to the male connectors 8a and the female connectors 8b of each mat 1. When, in order to replace any one mat laid in the lateral and longitudinal directions by new one, for example, the old mat 1 is removed and the new mat 1 is connected to the mats 1 located right and left and up and down, the replacement work is very difficult since the existing mats have shrunk. (Through repeated experiments, it was confirmed that it was very difficult to perform the connection for the male connectors 8a and the female connectors 8b in the longitudinal direction, but it is not so difficult to perform the connection for the male connectors 8a and the female connectors 8b in the lateral direction.) This is fatal in the maintenance aspect.

After all, it is necessary to again replace all the mats 1 by new ones only for the replacement of the single mat 1.

Also, this system suffers from other disadvantages in that it is difficult to locate the old mat 1 by a new one at high temperature, and the mats 1 are pushed against each other so that the skiing slope as a whole is corrugated or wavy in addition to the affect of the force applied in the fall line direction upon the edging action described in the above-described disadvantage (1).

SUMMARY OF THE INVENTION

Accordingly, in order to solve the above-described disadvantages, an object of the present invention is to proved a skiing slope specialized for artificial skis and a method for producing the same.

According to the present invention, there is provided a skiing slope specialized for artificial skis, which is formed by longitudinally and laterally laying and connecting mats each having a predetermined area on a slanted surface, wherein each of the mats has a plurality of retainer projections on its rear side, at least one connector member having side walls which engage with circumferential surfaces of the retainer projections in a convex/concave manner is disposed between the retainer projections of the mats, the connector member is coupled with a hard longitudinal member provided in the longitudinal direction of the slanted surface, and the connector member is coupled with the mats under the condition that the circumferential surfaces of the retainer projections and the side walls of the connector member are engaged with each other in the convex/concave manner between the retainer projections of the mats.

According to another aspect of the invention, in the skiing slope specialized for artificial skis, it is preferable that the connector member has a thickness which is substantially equal to a height of the retainer projections of the mats or smaller than the height of the retainer projections of the mats.

According to still another aspect of the invention, in the skiing slope specialized for artificial skis, the outer circumferential surfaces of the retainer projections of the mats are in the form of cylinders, and one-fourth arcuate recess surfaces and one-half arcuate recess surfaces are formed on the side walls of the connector member. The one-fourth arcuate recess surfaces and one-half arcuate recess surfaces are engaged with the retainer projections having the cylindrical outer circumferential surfaces.

According to still another aspect of the invention, in the skiing slope specialized for artificial skis, the connector member is formed of two halves to be coupled, together and has a recess groove into which the hard longitudinal member is operative to be inserted and which is formed on at least one of the surfaces to be coupled to each other of the two halves, and the recess groove is formed with at least one bent portion but not a linear portion.

According to the present invention, there is provided a method for producing a skiing slope specialized for artificial skis, which is formed by longitudinally and laterally laying and connecting mats each having a predetermined area on a slanted surface, comprising the following steps of:

providing the mats each having a plurality of retainer projections on its rear side;

providing connectors to be connected to mats which are located adjacent to each mat at each side thereof in a longitudinal direction and a lateral direction;

providing at least one hard longitudinal member in the longitudinal direction on the slanted surface;

laying and fixing together a mat group, each of which is formed by connecting the plurality of mats by the connectors in the longitudinal direction, on the hard longitudinal member by engaging a suitable means provided on the hard longitudinal member and retainer projections formed on the mats of the mat group with each other;

laying and fixing together another similar mat group in the longitudinal direction at a predetermined space relative to the mat group which has been laid and fixed together in the previous step and;

laying and fixing together a plurality of mat groups side by side adjacent to the plurality of mat groups which have been laid and fixed together in the longitudinal direction in the previous steps in the same way by connecting at least one of the mats of the respective mat groups with each other by the connectors, thereby laying the mats onto the slanted surface.

The method for producing a skiing slope specialized for artificial skis may further comprise the following steps of:

fixedly securing hard lateral members perpendicular to the hard longitudinal member at a predetermined interval; and laying and fixing together the mat groups on the hard longitudinal member by engaging the hard lateral members and the retainer projections of the mats of the mat groups.

The method for producing a skiing slope specialized for artificial skis may further comprise the following steps of:

fixedly securing stops to the hard longitudinal member at a predetermined interval, and laying and fixing together, the mat groups on the hard longitudinal member by engaging the hard lateral members to be retained by the stops and the retainer projections of the mats of the mat groups.

According to another aspect of the invention, there is provided a method for producing a skiing slope specialized for artificial skis, which is formed by longitudinally and laterally laying and connecting mats each having a predetermined area on a slanted surface, comprising the following steps of:

providing the mats each having a plurality of retainer projections on its rear side;

providing connectors to be connected to mats which are located adjacent to each mat at each side thereof in a longitudinal direction and a lateral direction;

providing at least one hard longitudinal member in the longitudinal direction on the slanted surface;

fixedly securing, to the hard longitudinal member, at least one connector member having side walls to be engaged with outer circumferential surfaces of the retainer projections in a convex/concave manner and disposed between the retainer projections of the mat;

laying and fixing together, on the slanted surface, a mat group, each of which is formed by connecting the plurality of mats by the connectors in the longitudinal direction, by retaining at least one mat by locating the connector member in between the retainer projections of the mat and engaging the circumferential surfaces of the retainer projections and the side walls of the connector member with each other in a concave/convex engagement;

in the same way, laying and fixing together another similar mat group in the longitudinal direction at a predetermined space relative to the mat group which has been laid and fixed together in the previous step and;

laying and fixing together a plurality of mat groups side by side adjacent to the plurality of mat groups which have been laid and fixed together in the longitudinal direction in the previous steps in the same way by connecting at least one of the mats of the respective mat groups with each other by the connectors, thereby laying the mats onto the slanted surface.

According to another aspect of the invention, there is provided a method for producing a skiing slope specialized for artificial skis, which is formed by longitudinally and laterally laying and connecting mats 1 each having a predetermined area on a slanted surface, comprising the following steps of:

providing the mats each having a plurality of retainer projections on its rear side;

providing connectors to be connected to mats which are located adjacent to each mat at each side thereof in a longitudinal direction and a lateral direction;

providing at least one hard longitudinal member in the longitudinal direction on the slanted surface;

providing hard lateral members at a predetermined interval perpendicular to each hard longitudinal member;

laying and fixing together, on the hard longitudinal member, a mat group which is formed by connecting a plurality of mats in the longitudinal direction by connectors, by engaging the retainer projections of at least one mat with the hard lateral members;

in the same way, laying and fixing together another similar mat group in the longitudinal direction at a predetermined space relative to the mat group which has been laid and fixed together in the previous step;

laying and fixing together a plurality of mat groups side by side adjacent to the plurality of mat groups which have been laid and fixed together in the longitudinal direction in the previous steps in the same way by connecting at least one of the mats of the respective mat groups with each other by the connectors, thereby laying the mats onto the slanted surface.

According to still another aspect of the invention, there is provided a method for producing a skiing slope specialized for artificial skis, which is formed by longitudinally and laterally laying and connecting mats each having a predetermined area and made of synthetic resin on a slanted surface, comprising the following steps of:

providing the mats each having a plurality of retainer projections on its rear side;

providing connectors to be connected to mats which are located adjacent to each mat at each side thereof in a longitudinal direction and a lateral direction;

providing a plurality of hard longitudinal members, two of which form a pair, in the longitudinal direction on the slanted surface;

providing hard lateral members at a predetermined interval perpendicular to each of the pair of hard longitudinal members;

laying and fixing together, on the hard longitudinal member, a mat group which is formed by connecting a plurality of mats in the longitudinal direction by connectors, by engaging the retainer projections of only one mat with the hard lateral members;

in the same way, laying and fixing together another similar mat group in the longitudinal direction at a predetermined space relative to the mat group which has been laid and fixed together in the previous step;

laying and fixing together a plurality of mat groups side by side adjacent to the plurality of mat groups which have been laid and fixed together in the longitudinal direction in the previous steps in the same way by connecting the respective mats of the respective mat groups with each other by the connectors, thereby laying the mats onto the slanted surface.

In any of the described above, the predetermined space may be set so that, when ambient temperature is changed from a room temperature by about, a lower edge of the upper mat group is brought into contact with an upper edge of the lower mat group.

The hard longitudinal member provided on the slanted surface is connected to the connector members. The connector members are disposed between the retainer projections of the mats and the side walls of the connector members are engaged in a convex/concave manner with the circumferential surfaces of the retainer projections. Accordingly, the mats are fixedly laid and fixed together on the slanted surface.

Each mat of each mat group is connected in the longitudinal direction by the connectors. A certain mat of the mat group is engaged, by the retainer projections and the connector members, in a convex/concave manner as described above. All the mat groups are not coupled with each other in the longitudinal direction. Each mat of each mat groups is connected, by the connectors, with the adjacent mats of the mat groups located on both sides (in the lateral direction).

Since a certain mat of the mat group is subjected to the convex/concave engagement between the retainer projections and the connector members in each mat group, there is no fear that the mat groups would be displaced slidingly along the slanted surface. Accordingly, even if each mat is subjected to a force in the fall line by the edging action during skiing, there is no fear that the each might be displaced slidingly.

Also, since all the mat groups are not coupled with each other in the longitudinal direction and a predetermined space is present therebetween, even if the mats are expanded due to the temperature difference, there is no fear that the rising action of the mats would occur. Additionally, it is possible to easily perform the replacements of the damaged mats for new mats due to the predetermined space.

Since a certain mat of each mat group is retained by the retainer projection and the hard lateral members, there is no fear that the mat group is displaced along the slanted surface. Accordingly, even if each mat is subjected to a force in the fall line by the edging action during skiing, there is no fear that the each might be displaced slidingly.

Also, since all the mat groups are not coupled with each other in the longitudinal direction and a predetermined space is present therebetween, even if the mats are expanded due to the temperature difference, there is no fear that the rising action of the mats would occur.

Additionally, it is possible to easily perform the replacements of the damaged mats with new mats.

As described above, according to the present invention, it is possible to always provide a skiing area or a slope which is flat on the surface without any corrugations and to easily perform the maintenance work therefor.

DETAILED DESCRIPTION OF THE PREFERRED EMBODIMENTS

Figure 1:
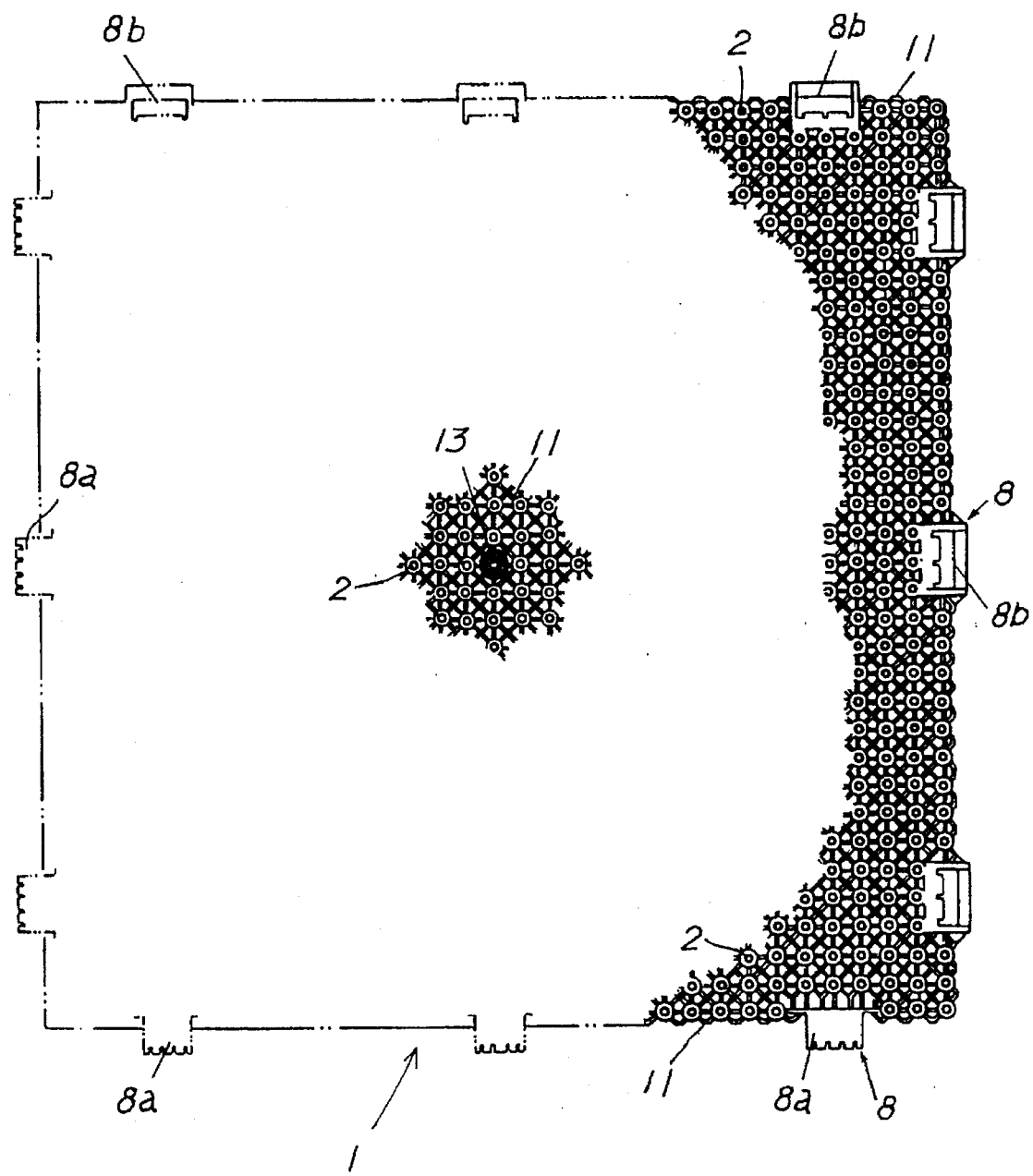
FIG. 1 is a partial plan view showing a mat according to one embodiment of the invention.
Figure 2:
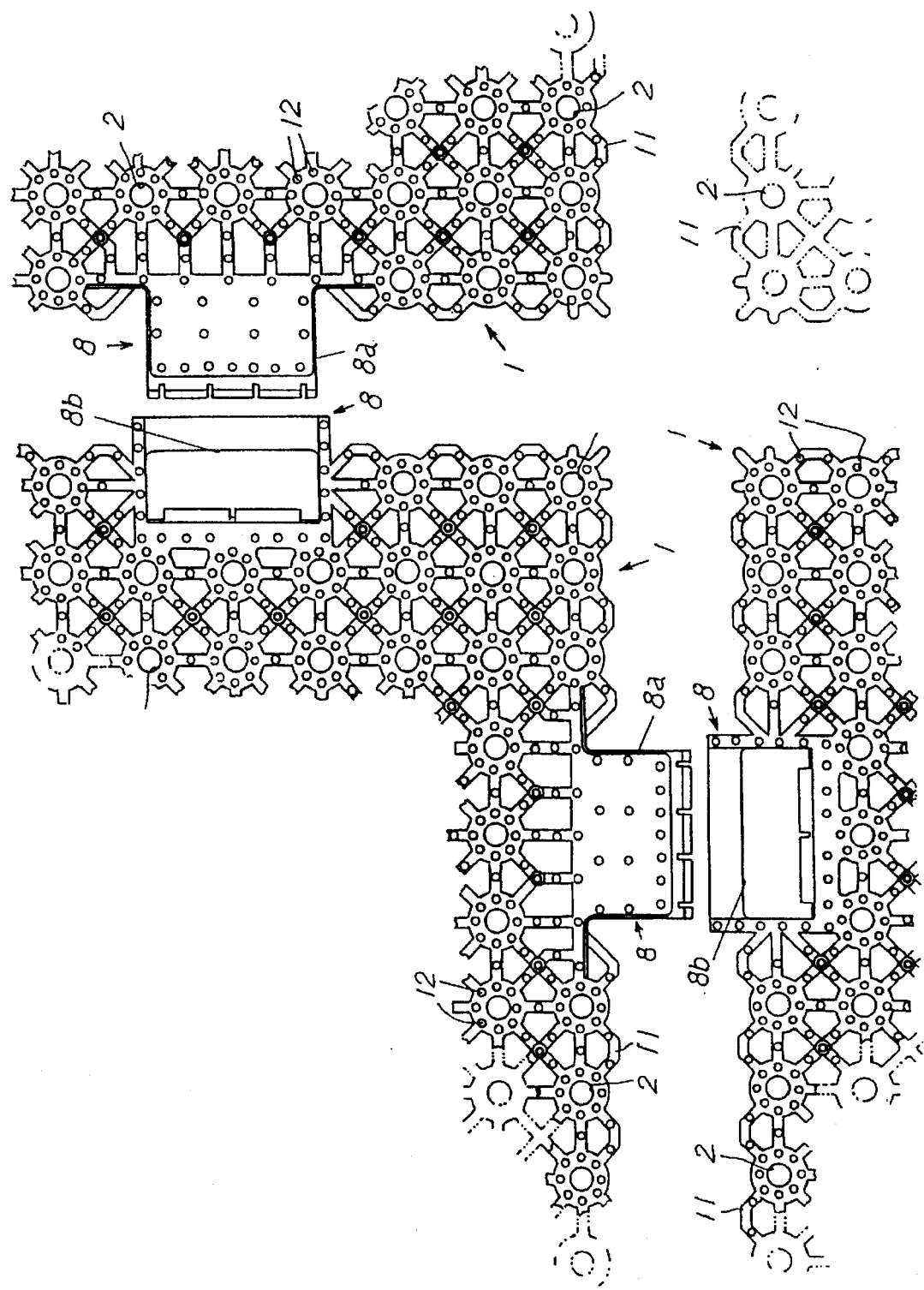
FIG. 2 is a partially enlarged plan view showing a state in which mats according to the embodiment have not yet been coupled with each other.
Figure 3:
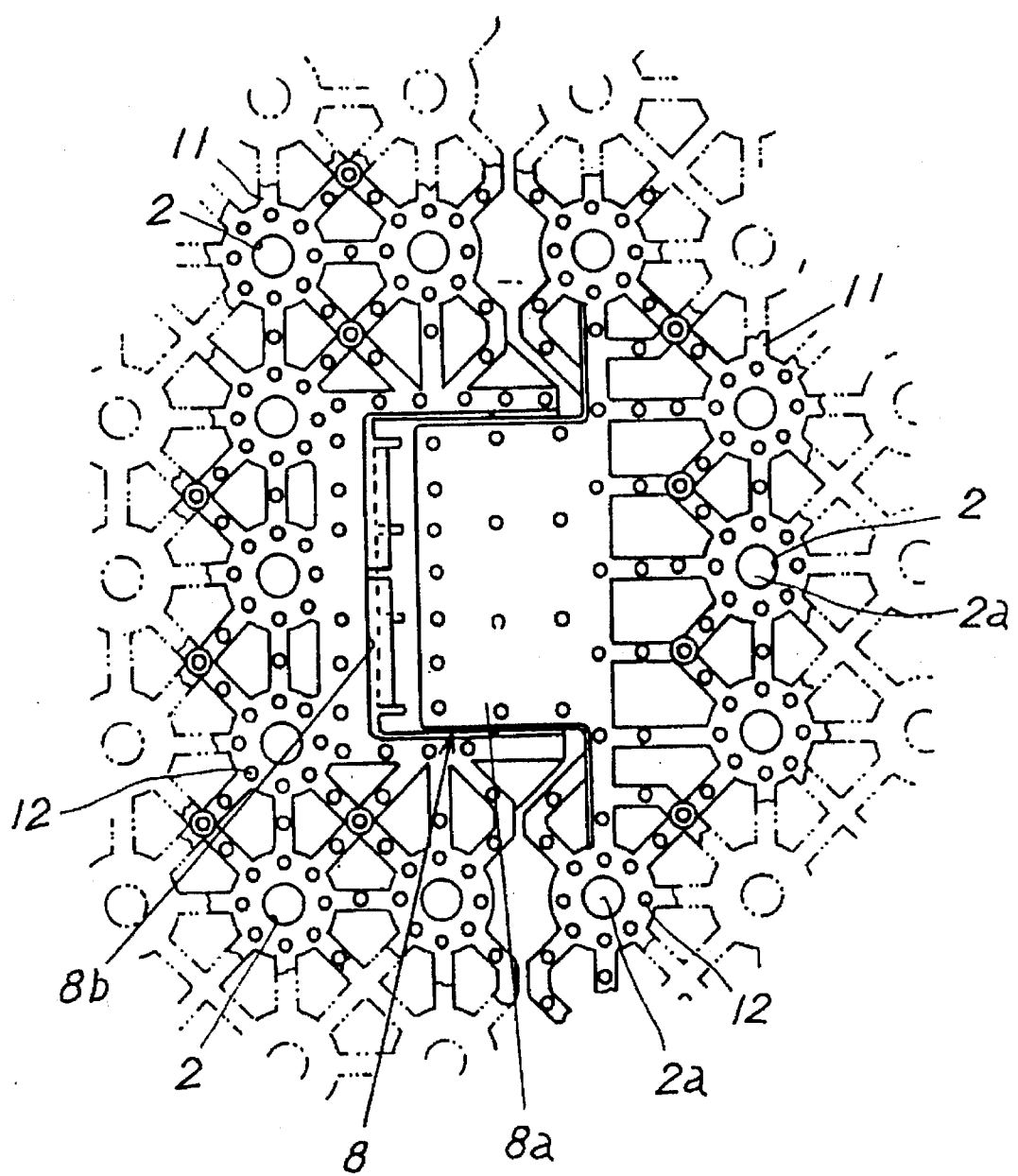
FIG. 3 is a partially enlarged plan view showing a state in which mats according to the embodiment have been coupled with each other.

The present invention will now be described by way of example with reference to the accompanying drawings.

A mat 1 in accordance with one embodiment is integrally made of synthetic resin. The reason why it is made of synthetic resin is because of manufacturing efficiency, a weight reduction aspect and a safety aspect in the case where the skier falls down to the mat 1 are considered. Furthermore, by making the mat 1 of synthetic resin, wear of a sliding portion (for example, a tire) of a roller ski or the like may be prevented as much as possible.

Also, the skiing area (skiing slope) in accordance with this embodiment is specialized for, but not limited to, wheeled skis provided at, bottom surfaces of skiing plates with wheels as disclosed in, for example, Japanese Patent Application No. Hei 4-138927, Japanese Patent Application No. Hei 4-138928, Japanese Patent Application No. Hei 4-138929, Japanese Patent Application No. Hei 4-138930 filed by the present applicant, or the like.

A mat 1 which is one meter wide and one meter long is formed. The mat 1 has a structure in which a plurality of cylindrical retainer projections 2 are connected to each other through ribs 11 having a smaller thickness than that of the retainer projections 2. The retainer projections 2 project from a back side of the mat 1. Inner holes 2a of the retainer projections 2 serves to bring out the water-permeation. Incidentally, it should be noted that the mat 1 is reduced in weight and the resin may be saved corresponding to the existence of the inner holes 2a.

The retainer projections 2 make the back surface of the mat 1 corrugated in a concave/convex manner. In the first embodiment of the invention, connector members 4 are disposed between the retainer projections 2. In a second embodiment of the invention, hard longitudinal members 31 and hard lateral members 32 are disposed between the retainer projections 2.

Small projections 12 in the form of projected hemispheres each having a radius of 1.0 to 1.3 mm are provided on a top surface of the mat 1. The small projections 12 prevent the skier from slipping while skiing, in particular, in case of rain water. In order to equalize a grip force in any direction during skiing, the small projections 12 are formed in projecting hemisphere shapes.

Three male connectors 8a are projectingly formed on each of the adjacent sides of the mat 1 and three female connectors 8b are projectingly formed on each of the other adjacent sides of the mat 1 as the connectors 8.

Figure 4:
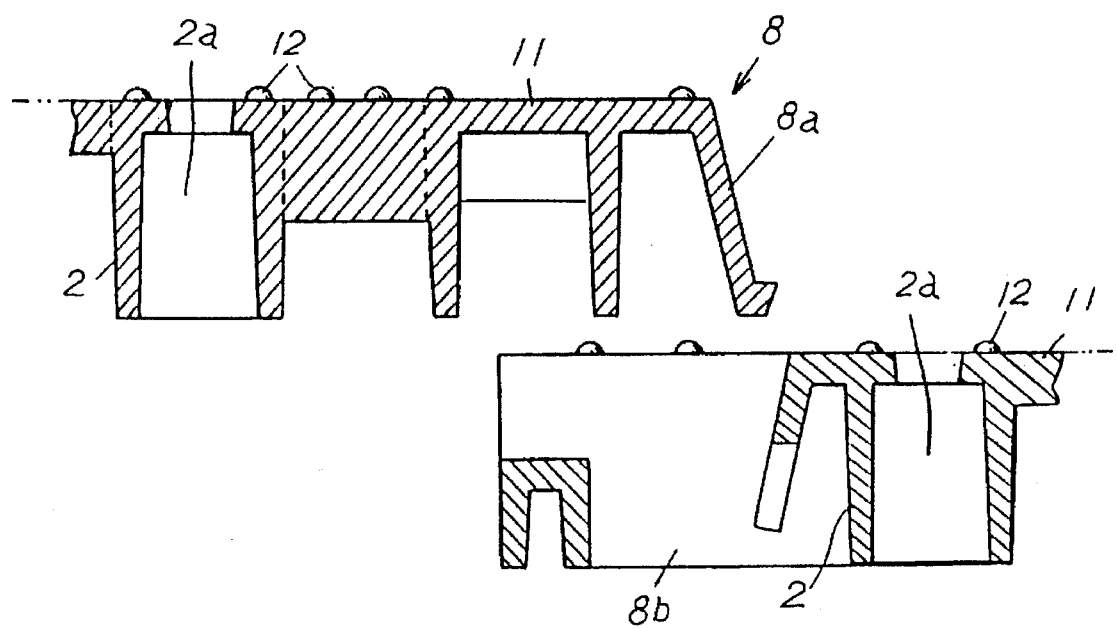
FIG. 4 is a partial cross-sectional view showing a mat according to the embodiment of the invention.
Figure 5:
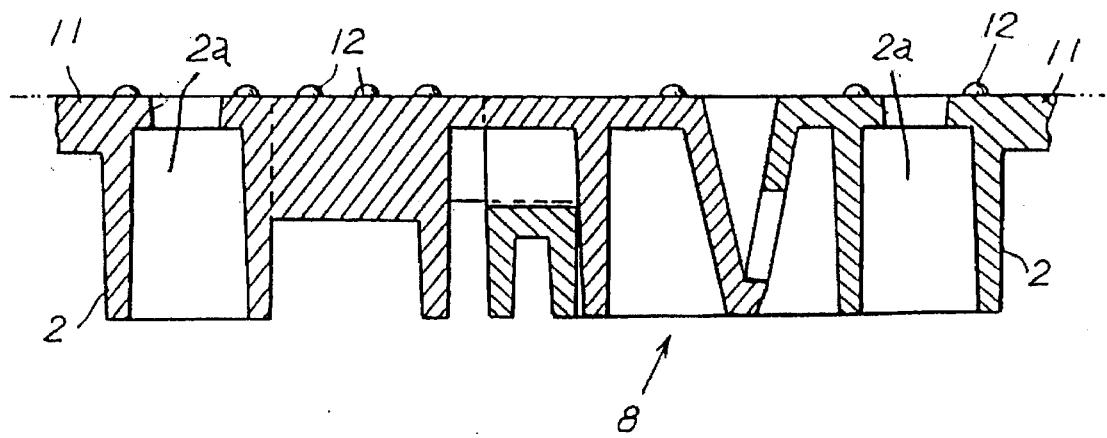
FIG. 5 is another partial cross-sectional view showing a mat according to the embodiment of the invention.
Figure 6:
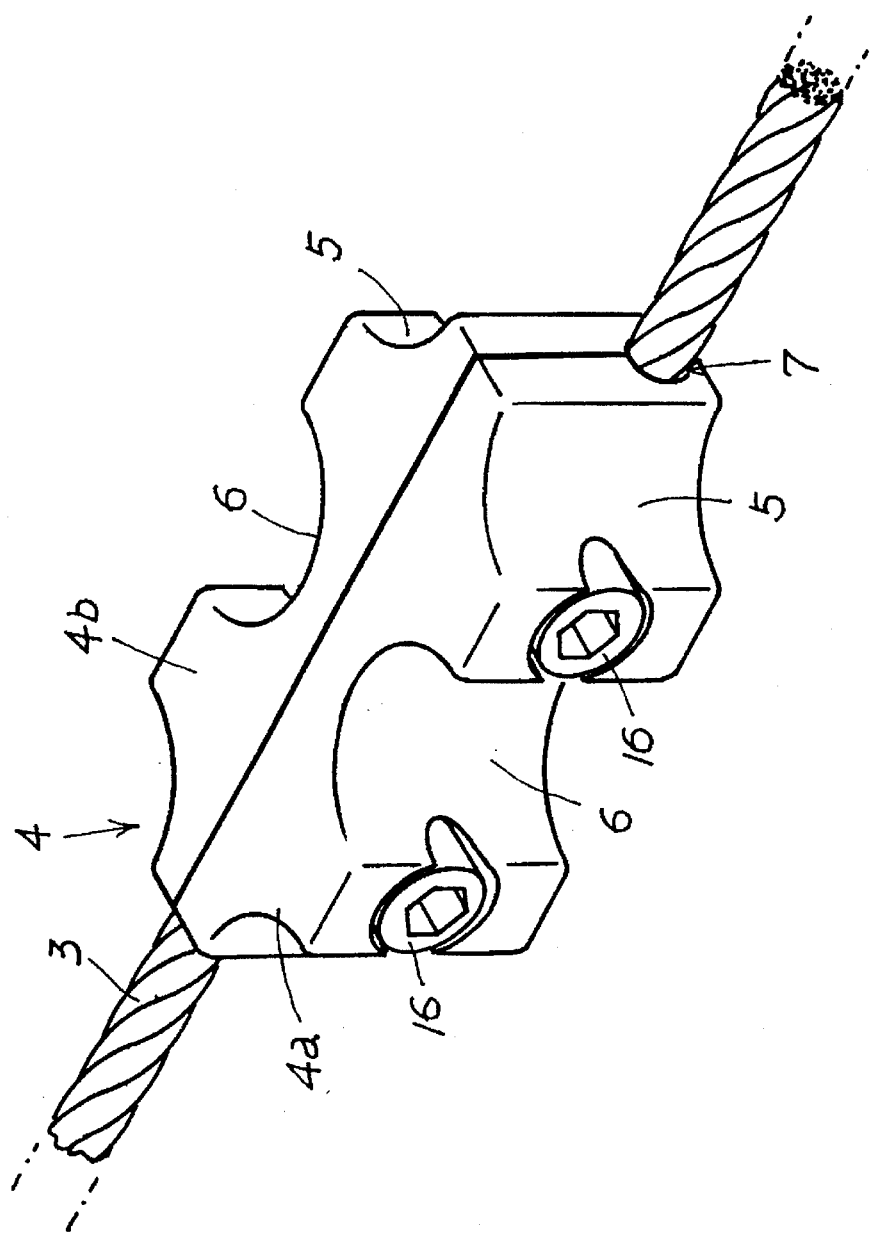
FIG. 6 is a perspective view showing a connector member in accordance with the embodiment.
Figure 7:
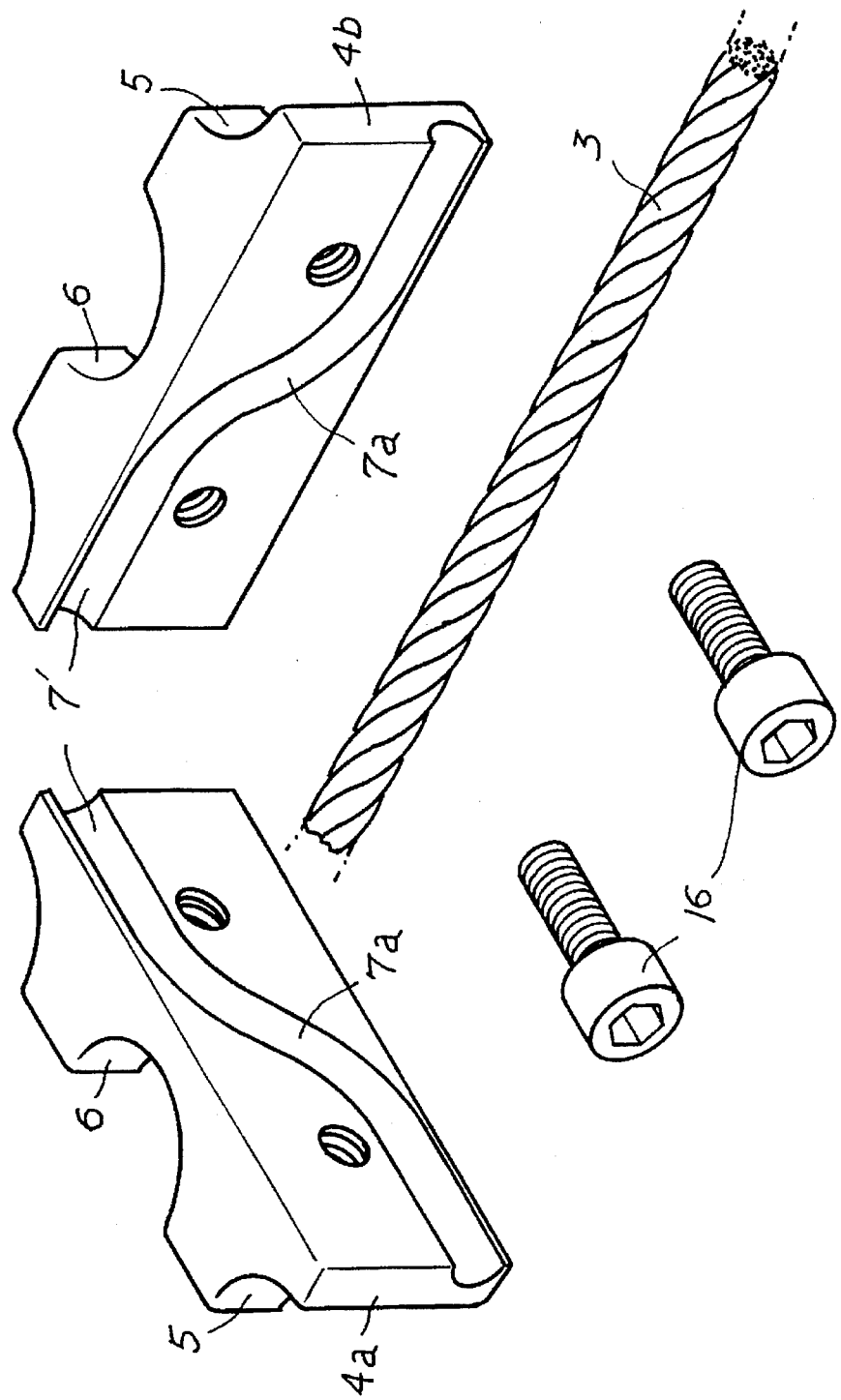
FIG. 7 is an exploded perspective view showing the connector member in accordance with the embodiment.

In order to connect the mats 1 with each other, the male connectors 8a of one mat 1 are connected to the female connectors 8b of the other adjacent mat 1 (see FIGS. 4 and 5).

A concave groove 13 is formed in the central portion of the mat 1 for implanting therein a pole, a flag rod, a marker or the like. This concave groove 13 is set at a depth such that the pole may readily be removed even if the skier collides against the pole during a contest.

The mat 1 having the above-described structure is designed so as not to physically generate an internal stress to a temperature change in the range of 25° C. in the fixed assembled condition of each side.

Figure 10:
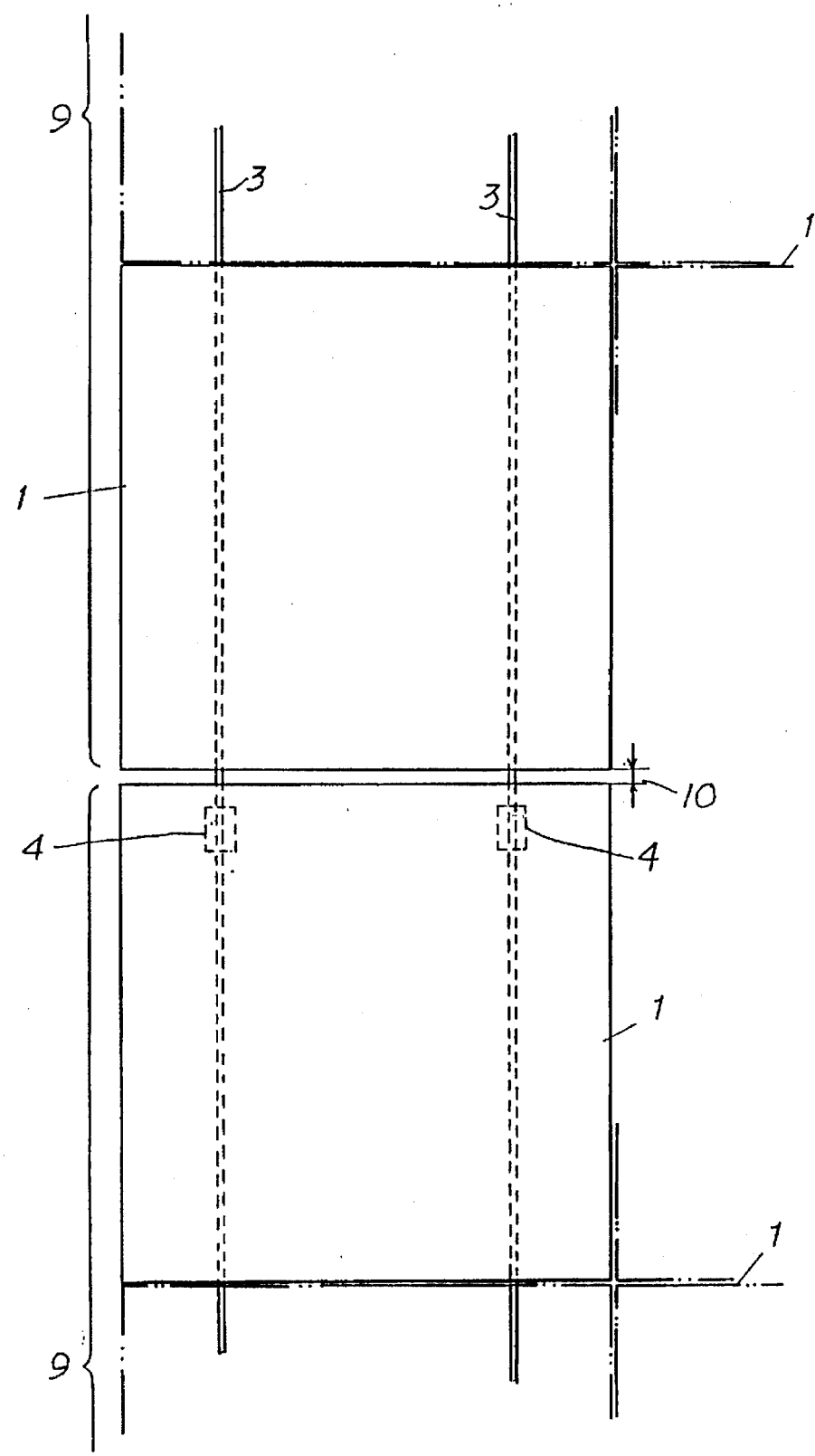
FIG. 10 is another schematic view showing the first embodiment.
Figure 11:
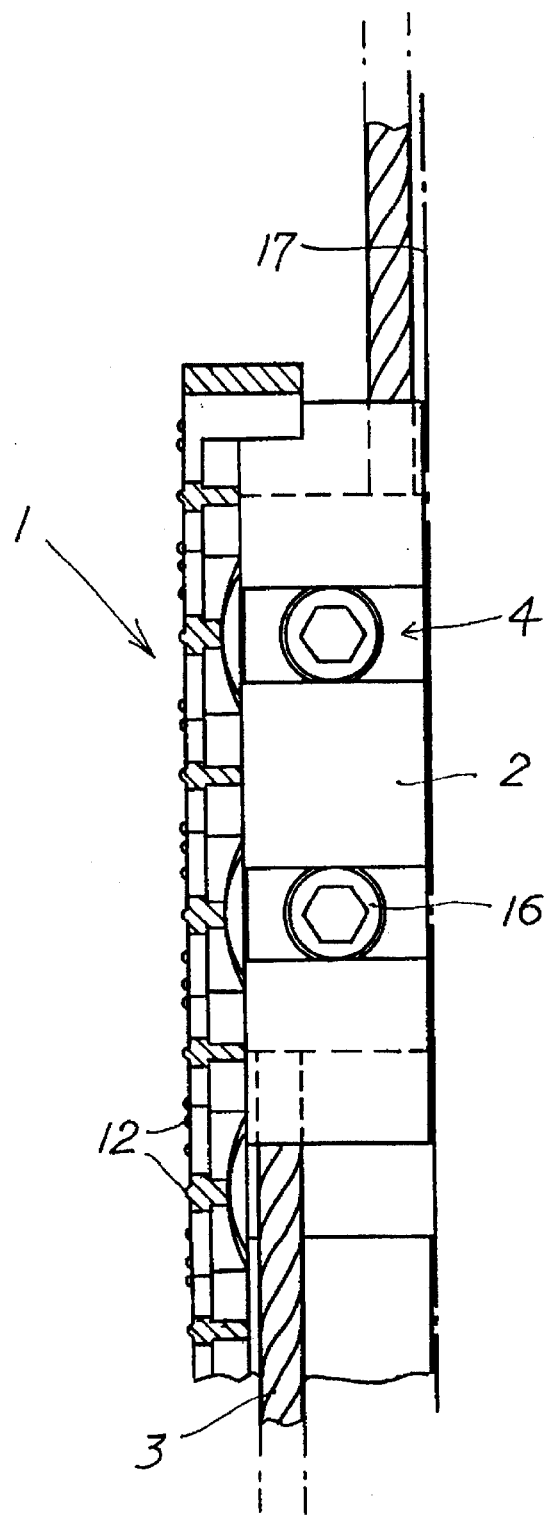
FIG. 11 is an illustration of a state in use of the first embodiment.

More specifically, the thus constructed mat 1 is made of polypropylene resin. A linear expansion coefficient of the mat 1 is set at $11 \times 10^{-5}$ (refer to the fact that the linear expansion coefficient of a steel is $11.5 \times 10^{-6}$ and the longitudinal spring constant of the steel is $2.1 \times 10^6$. Accordingly, the mat 1 has the characteristics such that when the atmospheric temperature becomes 50° C., a gap between a lower edge of the mat 1 of the upper mat group 9 and an upper edge of the mat 1 of the lower mat group 9 is at zero mm, when the atmospheric temperature is at 25° C., the gap is at 7 mm, and when the atmospheric temperature is at 0° C., the gap is at 14 mm. Accordingly, each mat group 9 is overlaid so that a space 10 in the longitudinal direction between each adjacent mat groups 9 is at 7 mm (see FIG. 10).

The connector member 4 is formed by coupling halves 4a and 4b, made of synthetic resin, with each other in view of the facilitation of manufacturing and coupling with a hard longitudinal member 3 (i.e., wire).

Figure 8:
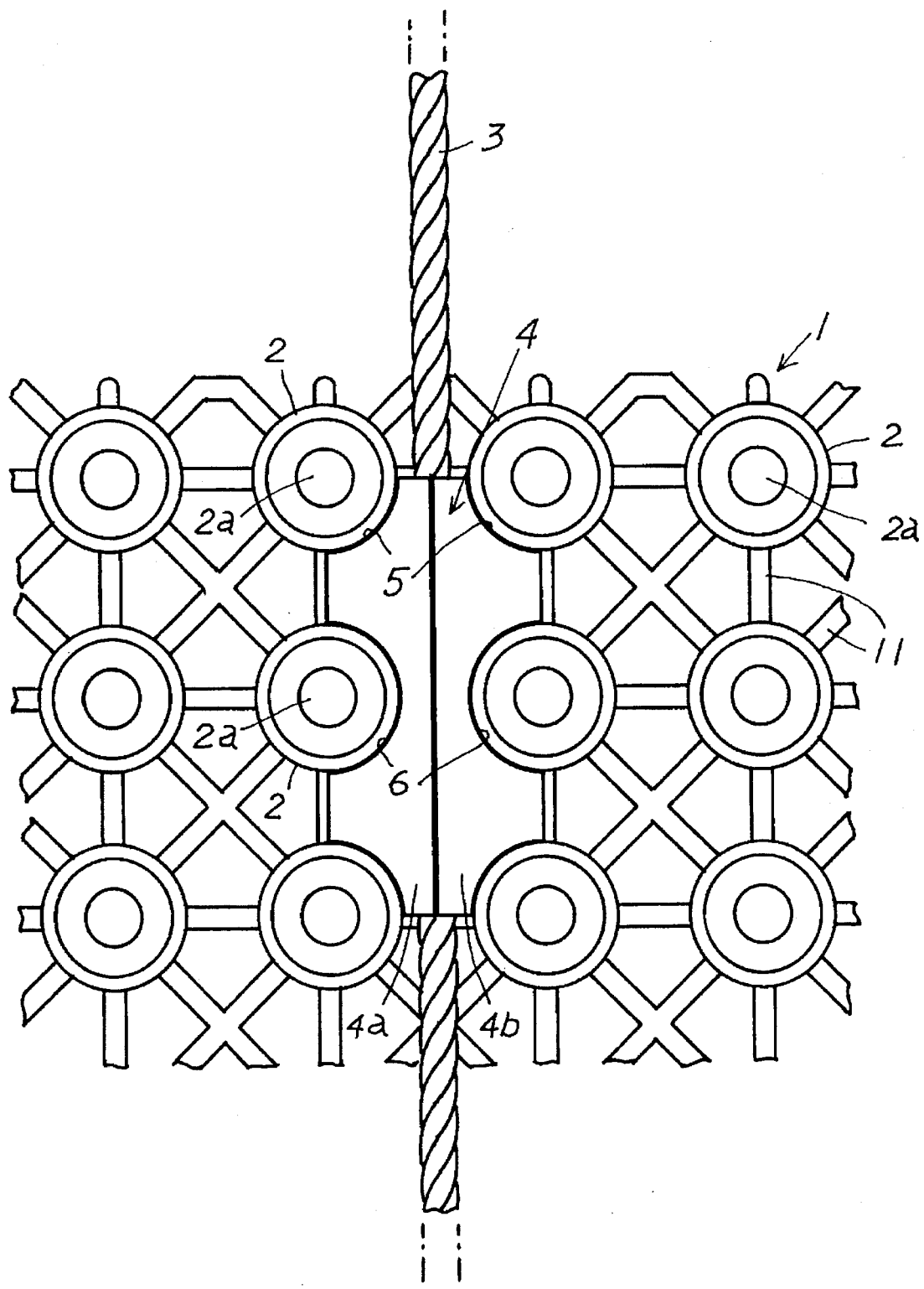
FIG. 8 is an illustration of a joint condition between the connector member and the mat in accordance with the embodiment.
Figure 9:
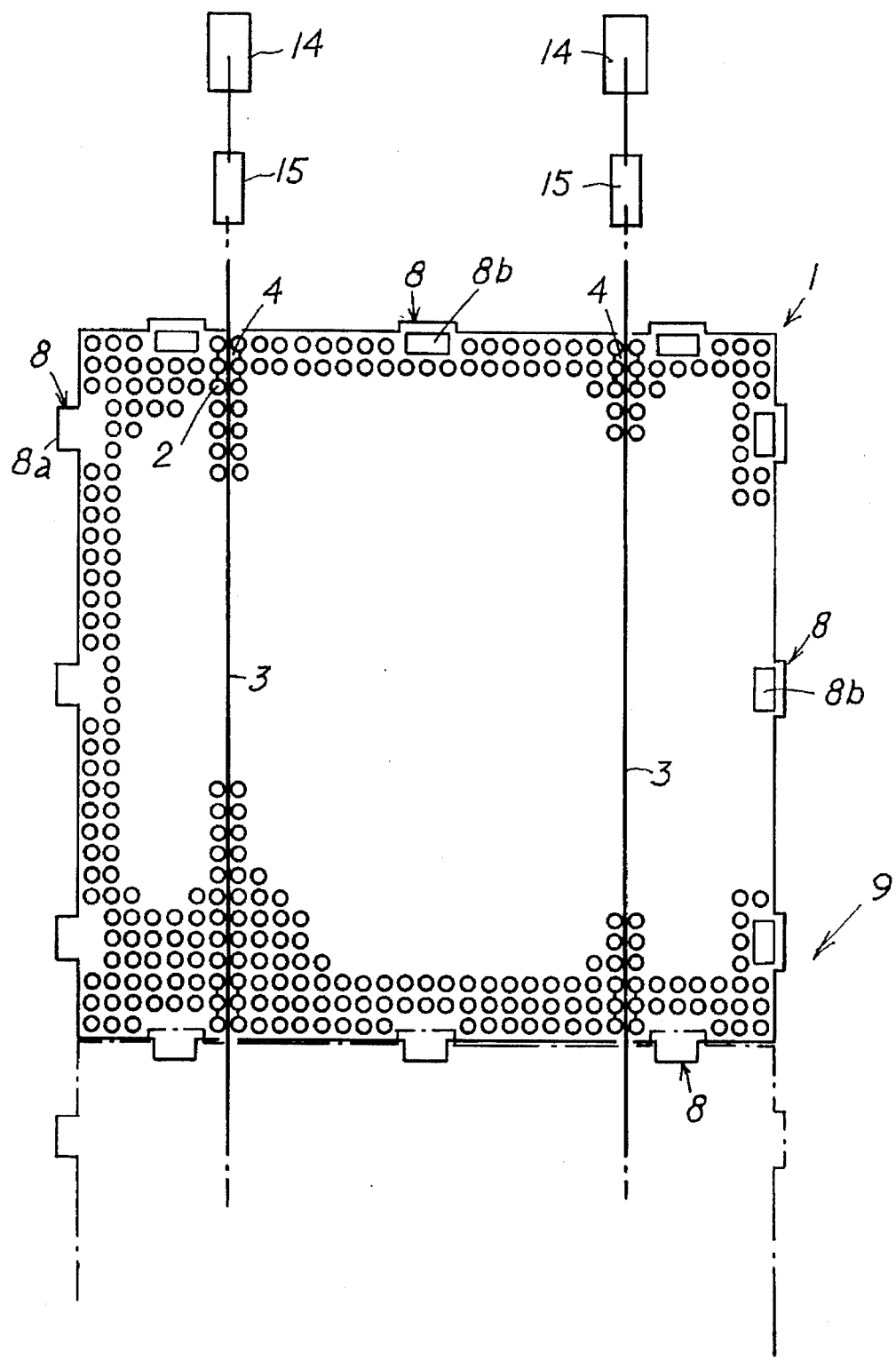
FIG. 9 is a schematic view showing the first embodiment.

The connector member 4 has a thickness which is equal to a height of the retainer projections 2. One fourth arcuate recess surface 5, one half arcuate recess surface 6 and another one fourth arcuate recess surface 5 are formed at an interval on each side wall of the connector member 4 in order from the upper side (FIG. 8). When the connector member 4 is inserted among the six retainer projections 2, the one fourth arcuate recess surfaces 5 and the one half arcuate recess surfaces 6 are engaged with the outer circumferential surfaces of the retainer projections 2 in a concave/convex manner. Incidentally, if a thickness of the connector member 4 is greater than the height of the retainer projections 2, when the connector member 4 is inserted in between the retainer projections 2, the connector member 4 projects from an end face of each retainer projection 2. In this case, parts to be in contact with the slanted surface 17 are not the end faces of the retainer projections 2 but top surfaces of the connector members 4, resulting in prevention of the retainer action of the retainer projections 2 to the slanted surface 17. In view of this, the thickness of the connector member 4 should be set substantially at the same level as or lower than the height of the retainer projections 2.

Also, a semicylindrical groove 7' into which half the hard longitudinal member 3 (wire) is to be inserted is formed on each of surfaces to be coupled each other of the halves 4a and 4b. The wire is just inserted into a hole which is defined by the coupling of the two semicylindrical grooves 7'.

The combined hole 7 is not linear but has a bent portion 7a. Thus, the joint between the wire and the connector member 4 is strengthened in the longitudinal direction by the bent portion 7a.

Reference numeral 16 denotes bolts.

A method for laying the mats 1 according to the first embodiment will now be described with reference to FIGS. 8, 9, 10 and 11.

First of all, for the foundation, a sinking prevention (formation of gravel layers) and a flattening or leveling work (eliminating projections or convex/concave parts) are carried out for the mats 1 to form a desired slanted surface 17.

Subsequently, a pair of wires as the hard longitudinal members 3 are arranged at a plurality of locations along the slanted surfaces 17 in the fall line direction (longitudinal direction) at an interval of 50 to 60 cm. (Also, it is of course possible to add a plurality (desired number) of wires between the above-described two wires.) Upper ends of the two wires are, respectively, connected at the upper portion of the slanted surface 17 through turn buckles 15 to fastening members 14 fixed to the slanted surface 17. The turn buckles 15 make it possible to adjust the position of the wires relative to the slanted surface 17 suitably.

Subsequently, the connector members 4 are connected to a suitable position of the wires. It is of course possible to use the wires on which the connector members 4 have been attached in advance.

Subsequently, the mat 1 is laid on the wires so that the connector members 4 are located between the retainer projections 2. The outer circumferential surfaces of the retainer projections 2 and the one fourth arcuate recess surfaces 5 and the one half arcuate recess surfaces 6 of the connector members 4 are engaged with each other in the concave/convex engagement manner.

Next, four mats 1 are connected to the mat 1 which has been laid on the slanted surface 17, by utilizing the connectors 8 in the longitudinal direction. In total, the mat group 9 of the five mats 1 are laid and fixed together on the slanted surface 17. (In this case, the wires are located between the retainer projections 2 of each mat 1).

This work is affected to the pair of wires in the same manner. The mat groups 9 each of which includes the thus laid and fixed together five mats 1 are coupled with each other by the connectors 8 in the lateral direction.

The mat group 9 of five mats 1 are laid and fixed together on the upper side of the plurality of mat groups 9. In this case, the mat group 9 is not coupled with the lower mat groups 9 which have already been laid. Namely, the projecting portions, from the mats 1 are cut corresponding to the female connectors 8b of the lowermost mat 1 of the upper mat group 9 and the male connectors 8a of the uppermost mat 1 of the lower mat group 9.

As described above, according to this embodiment, with the mats 1, it is possible to enjoy the advantages that: the mats 1 will not be displaced down even if any force is applied in the fall line direction by the edging operation during the skier's skiing since the preselected retainer projections 2 of the mats 1 and the connector members 4 fixed to the wires are engaged with each other; accordingly, no creases will be generated on the lower mats 1 on the slanted surface; and accordingly no mat rising phenomenon will occur, to thereby prevent the wavy or corrugated skiing area.

Also, since all the mats 1 are not coupled with each other in the longitudinal direction but the mats 1 are grouped into the groups having a predetermined number (five in this case) of mats 1 to form spaces 10 therebetween, even if the mats 1 are expanded due to the temperature difference, there is no fear that the rising action of the mats 1 will occur. Accordingly, there is no wavy or corrugated skiing area. Additionally, it is possible to will perform the replacements of the mats 1 as desired.

Figure 12:
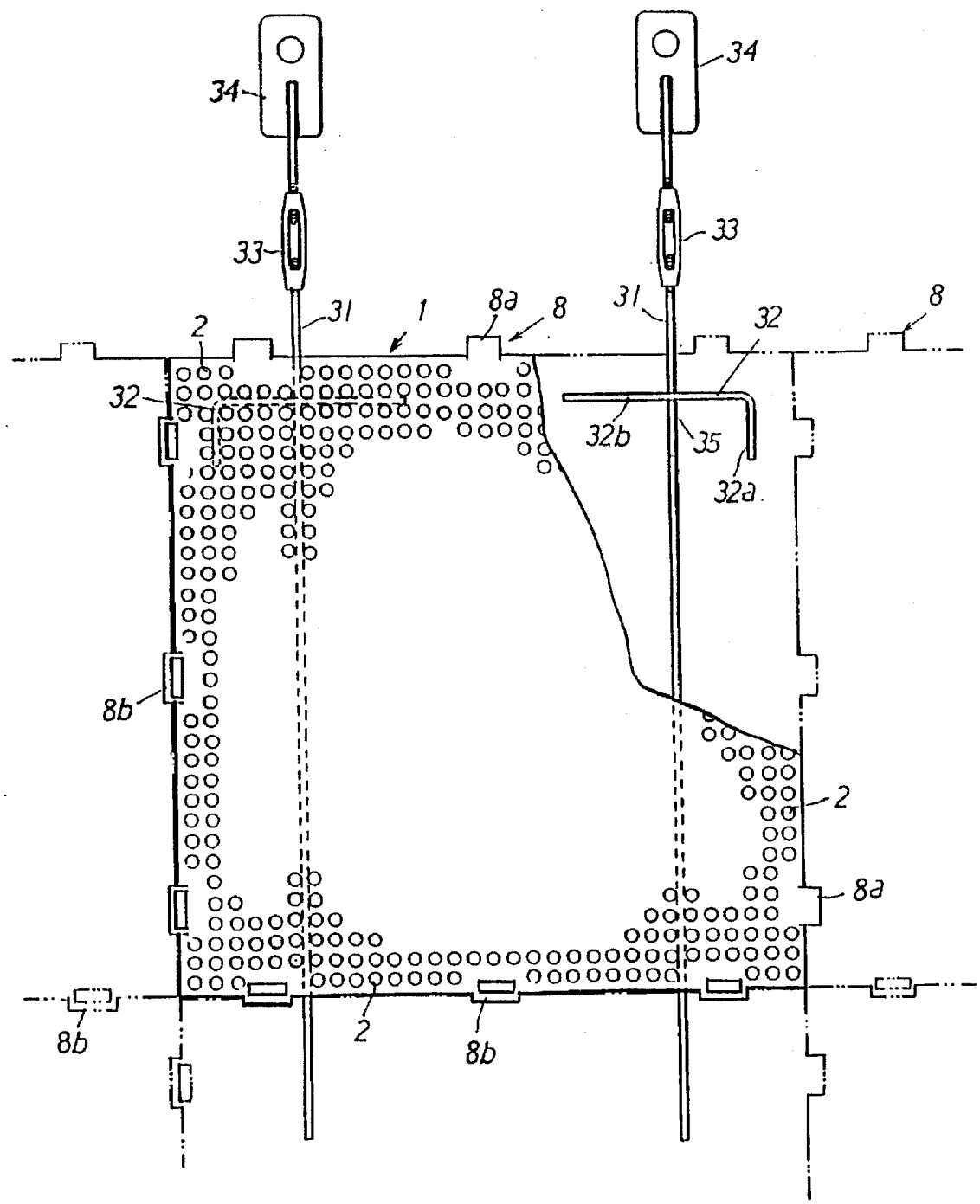
FIG. 12 is an illustration of a process for a second embodiment of the invention.
Figure 13:
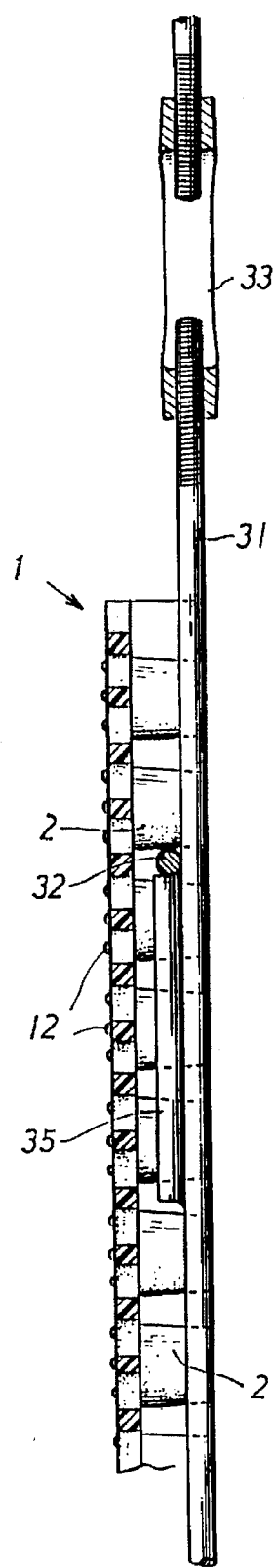
FIG. 13 is a cross-sectional view showing the process for a second embodiment of the invention.
Figure 14:
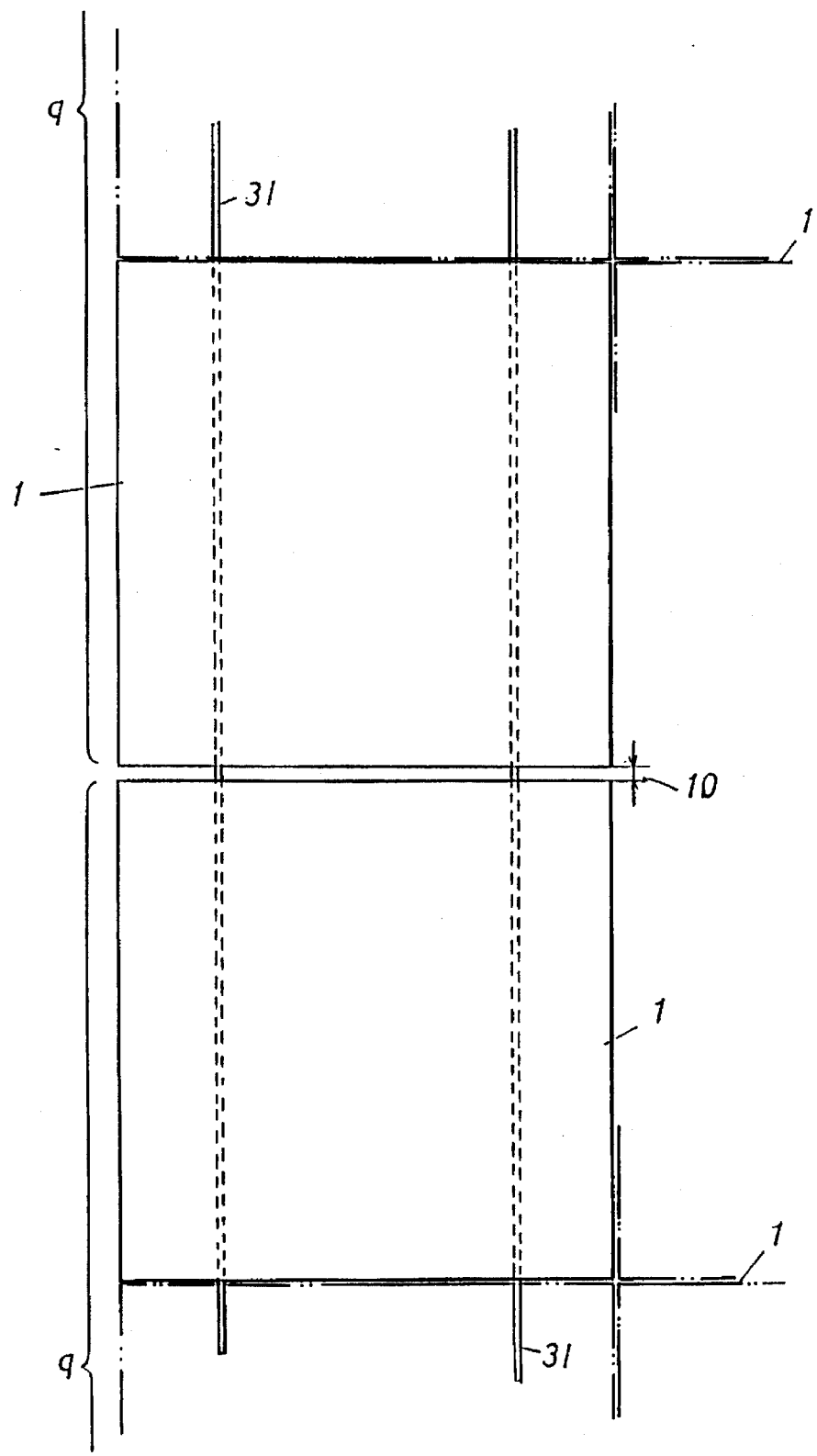
FIG. 14 is an illustration of the process for the second embodiment of the invention.

A mat laying method according to the second embodiment will now be described with reference to FIGS. 12, 13 and 14.

First of all, for the foundation, a sinking prevention (formation of gravel layers) and a flattening or leveling work (eliminating projections or convex/concave parts) are carried out for the mats 1 to form a desired slanted surface.

Subsequently, a pair of longitudinal steel wires as the hard longitudinal members 31 are arranged at a plurality of locations along the slanted surfaces in the fall line direction (longitudinal direction) at an interval of 50 to 60 cm. (Also, it is course possible to add a plurality (desired number) of longitudinal steel wires between the above-described two longitudinal steel wires.) Upper ends of the two longitudinal steel wires are, respectively, connected at the upper portion through turn buckles 33 to implanted fastening members 34. The turn buckles 33 make it possible to adjust the position of the longitudinal steel wires relative to the slanted surface suitably.

Subsequently, stops 35 are fixed to each longitudinal steel wire at an interval of about 5 m.

Subsequently, a lateral steel wire which is used as a hard lateral member 32 having, at a lateral portion 32b, a longitudinal portion 32a in parallel to the longitudinal steel wires is engaged in between the retainer projections 2 projecting from the back side of each mat 1.

Subsequently, the mat 1 provided with the lateral steel wire is laid on the longitudinal wire with the lateral portion 32b engaged with the stop 35 (in the condition that the lateral portion 32b is perpendicular to the longitudinal wire). The longitudinal wire and the stop 35 are inserted between the retainer projections 2 of the mat 1.

Incidentally, in the case where the stops 35 are not used, the lateral steel wire is fixed to the longitudinal steel wire.

Next, four mats 1 are connected to the mat 1 which has been laid on the slant surface, by utilizing the connectors 8 in the longitudinal direction. In total, the mat group 9 of the five mats 1 are laid and fixed together.

This work is affected to the pair of longitudinal steel wires. The mat groups 9 each of which includes the thus laid and fixed together five mats 1 are coupled with each other by the connectors 8 in the lateral direction.

In the same way, the mat group 9 of five mats 1 are laid and fixed together on the upper side of the plurality of mat groups 9.

In this case, the mat group 9 is not coupled with the lower mat groups 9 which have already been laid. Namely, the projecting portions, from the mats 1, are cut corresponding to the female connectors 8b of the lowermost mat 1 of the upper mat group 9 and the male connectors 8a of the uppermost mat 1 of the lower mat group 9.

As described above, according to this embodiment, with the mats 1, it is possible to enjoy the advantages that: the mats 1 will not be displaced down even if any force is applied in the fall line direction by the edging operation during the skier's skiing since the retainer projections 2 are retained by the lateral steel wires; accordingly, no creases will be generated on the lower mats 1 on the slanted surface; and accordingly no mat rising phenomenon will occur, to thereby prevent the wavy or corrugated skiing area.

Also, since all the mats 1 are not coupled with each other in the longitudinal direction but the mats 1 are grouped into the groups having a predetermined number (five in this case) of mats 1 to form spaces 10 therebetween, even if the mats 1 are expanded due to the temperature difference, there is no fear that the rising action of the mats 1 will occur. Accordingly, there is no wavy or corrugated skiing area. Additionally, it is possible to easily perform the replacements of the mats 1 as desired.

Incidentally, it is possible to ensure the same effect if two or more lateral steel wires are provided per one mat group 9.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A skiing slope specialized for artificial skis, which is formed by longitudinally and laterally laying and connecting mats (1) each having a predetermined area on a slanted surface (17), wherein each of the mats (1) has a plurality of retainer projections (2) on a rear side thereof, at least one connector member (4) having side walls which engage with circumferential surfaces of the retainer projections (2) in a convex/concave manner is disposed between the retainer projections (2) of the mats (1), the connector member (4) is coupled with a hard longitudinal member (3) provided in the longitudinal direction of the slanted surface (7), and the connector member (4) is coupled with the mats (1) under the condition that the circumferential surfaces of the retainer projections (2) and the side walls of the connector member (4) are engaged with each other in the convex/concave manner between the retainer projections (2) of the mats (1).

2. The skiing slope specialized for artificial skis according to claim 1, wherein the connector member (4) has a thickness which is substantially equal to a height of the retainer projections (2) of the mats (1) or smaller than the height of the retainer projections (2) of the mats (1).

3. The skiing slope specialized for artificial skis according to claim 1, wherein the outer circumferential surfaces of the retainer projections (2) of the mats (1) are in the form of cylinders, and one-fourth arcuate recess surfaces (5) and one-half arcuate recess surfaces (6) are formed on the side walls of the connector member (4), said one-fourth arcuate recess surfaces (5) and one-half arcuate recess surfaces (6) are engaged with the retainer projections (2) having the cylindrical outer circumferential surfaces.

4. The skiing slope specialized for artificial skis according to claim 1, wherein the connector member (4) is formed of two halves (4a) and (4b) to be coupled together, and has a recess groove (7) into which the hard longitudinal member (3) is operative to be inserted and which is formed on at least one of the surfaces to be coupled to each other of said two halves (4a) and (4b), and said recess groove (7) is formed with at least one bent portion (7a) but not a linear portion.

5. A method for producing a skiing slope specialized for artificial skis, which is formed by longitudinally and laterally laying and connecting mats (1) each having a predetermined area on a slanted surface (17), comprising the steps of:

providing the mats (1) each having a plurality of retainer projections (2) on a rear side thereof;

providing connectors (8) to be connected to the mats (1) which are located adjacent to each of the mats (1) at each side thereof in a longitudinal direction and a lateral direction;

providing at least one hard longitudinal member (3, 31) in the longitudinal direction on the slanted surface (17);

laying and fixing together a mat group (9), each of which is formed by connecting the plurality of mats (1) by the connectors (8) in the longitudinal direction, on the hard longitudinal member (3, 31) by engaging a connector member provided on the hard longitudinal member (3, 31) and retainer projections (2) formed on the mats (1) of the mat group (9) with each other;

laying and fixing together another similar mat group (9) in the longitudinal direction at a predetermined space (10) relative to the mat group (9) which has been laid and fixed together in the previous step; and laying and fixing together a plurality of mat groups (9) side by side adjacent to the plurality of mat groups (9) which have been laid and fixed together in the longitudinal direction in the previous steps in the same way by connecting at least one of the mats (1) of the respective mat groups (9) with each other by the connectors (8), thereby laying the mats (1) onto the slanted surface (17).

6. The method for producing a skiing slope specialized for artificial skis, according to claim 5, further comprising the steps of:

fixedly securing hard lateral members (32) perpendicular to the hard longitudinal member (31) at a predetermined interval; and laying and fixing together the mat groups (9) on the hard longitudinal member (31) by engaging the hard lateral members (32) and the retainer projections (2) of the mats (1) of the mat groups (9).

7. The method for producing a skiing slope specialized for artificial skis, according to claim 6, wherein the predetermined space (10) is set so that, when ambient temperature is changed from a room temperature by about 25° C., a lower edge of an upper mat group (9) is brought into contact with an upper edge of a lower mat group (9).

8. The method for producing a skiing slope specialized for artificial skis, according to claim 5, further comprising the steps of:

fixedly securing stops (35) to the hard longitudinal member (31) at a predetermined interval; and laying and fixing together the mat groups (9) on the hard longitudinal member (31) by engaging hard lateral members (32) to be retained by the stops (35) and the retainer projections (2) of the mats (1) of the mat groups (9).

9. The method for producing a skiing slope specialized for artificial skis, according to claim 8, wherein the predetermined space (10) is set so that, when ambient temperature is changed from a room temperature by about 25° C., a lower edge of an upper mat group (9) is brought into contact with an upper edge of a lower mat group (9).

10. The method for producing a skiing slope specialized for artificial skis, according to claim 5, wherein the predetermined space (10) is set so that, when ambient temperature is changed from a room temperature by about 25° C., a lower edge of an upper mat group (9) is brought into contact with an upper edge of a lower mat group (9).

11. A method for producing a skiing slope specialized for artificial skis, which is formed by longitudinally and laterally laying and connecting mats (1) each having a predetermined area on a slanted surface (17), comprising the steps of:

providing the mats (1) each having a plurality of retainer projections (2) on a rear side thereof;

providing connectors (8) to be connected to mats (1) which are located adjacent to each mat (1) at each side thereof in a longitudinal direction and a lateral direction;

providing at least one hard longitudinal member (3) in the longitudinal direction on the slanted surface (17);

fixedly securing, to the hard longitudinal member (3), at least one connector member (4) having side walls to be engaged with outer circumferential surfaces of the retainer projections (2) in a convex/concave manner and disposed between the retainer projections (2) of the mat (1);

laying and fixing together, on the slanted surface (17), a mat group (9), each of which is formed by connecting the plurality of mats (1) by the connectors (8) in the longitudinal direction, by retaining at least one mat (1) by locating the connector member (4) in between the retainer projections (2) of the mat (1) and engaging the circumferential surfaces of the retainer projections (2) and the side walls of the connector member (4) with each other in a concave/convex engagement;

in the same way, laying and fixing together another similar mat group (9) in the longitudinal direction at a predetermined space (10) relative to the mat group (9) which has been laid and fixed together in the previous step; and laying and fixing together a plurality of mat groups (9) side by side adjacent to the plurality of mat groups (9) which have been laid and fixed together in the longitudinal direction in the previous steps in the same way by connecting at least one of the mats (1) of the respective mat groups (9) with each other by the connectors (8), thereby laying the mats (1) onto the slanted surface (17).

12. The method for producing a skiing slope specialized for artificial skis, according to claim 8, wherein the predetermined space (10) is set so that, when ambient temperature is changed from a room temperature by about 25° C., a lower edge of an upper mat group (9) is brought into contact with an upper edge of a lower mat group (9).

13. A method for producing a skiing slope specialized for artificial skis, which is formed by longitudinally and laterally laying and connecting mats (1) each having a predetermined area on a slanted surface (17), comprising the steps of:

providing the mats (1) each having a plurality of retainer projections (2) on a rear side thereof;

providing connectors (8) to be connected to mats (1) which are located adjacent to each mat (1) at each side thereof in a longitudinal direction and a lateral direction;

providing at least one hard longitudinal member (31) in the longitudinal direction on the slanted surface (17);

providing hard lateral members (32) at a predetermined interval perpendicular to each hard longitudinal member (31);

laying and fixing together, on the hard longitudinal member (31), a mat group (9) which is formed by connecting a plurality of mats (1) in the longitudinal direction by connectors (8), by engaging the retainer projections (2) of at least one mat (1) with the hard lateral members (32);

in the same way, laying and fixing together another similar mat group (9) in the longitudinal direction at a predetermined space (10) relative to the mat group (9) which has been laid and fixed together in the previous step; and laying and fixing together a plurality of mat groups (9) side by side adjacent to the plurality of mat groups (9) which have been laid and fixed together in the longitudinal direction in the previous steps in the same way by connecting at least one of the mats (1) of the respective mat groups (9) with each other by the connectors (8), thereby laying the mats (1) onto the slanted surface (17).

14. The method for producing a skiing slope specialized for artificial skis, according to claim 13, wherein the predetermined space (10) is set so that, when ambient temperature is changed from a room temperature by about 25° C., a lower edge of an upper mat group (9) is brought into contact with an upper edge of a lower mat group (9).

15. A method for producing a skiing slope specialized for artificial skis, which is formed by longitudinally and laterally laying and connecting mats (1) each having a predetermined area and made of synthetic resin on a slanted surface (17), comprising the steps of:

providing the mats (1) each having a plurality of retainer projections (2) on a rear side thereof;

providing connectors (8) to be connected to mats (1) which are located adjacent to each mat (1) at each side thereof in a longitudinal direction and a lateral direction;

providing a plurality of hard longitudinal members (31), two of which form a pair, in the longitudinal direction on the slanted surface (17);

providing hard lateral members (32) at a predetermined interval perpendicular to each of the pair of hard longitudinal members (31);

laying and fixing together, on the hard longitudinal member (31), a mat group (9) which is formed by connecting a plurality of mats (1) in the longitudinal direction by connectors (8), by engaging the retainer projections (2) of only one mat (1) with the hard lateral members (32);

in the same way, laying and fixing together another similar mat group (9) in the longitudinal direction at a predetermined space (10) relative to the mat group (9) which has been laid and fixed together in the previous step; and laying and fixing together a plurality of mat groups (9) side by side adjacent to the plurality of mat groups (9) which have been laid and fixed together in the longitudinal direction in the previous steps in the same way by connecting the respective mats (1) of the respective mat groups (9) with each other by the connectors (8), thereby laying the mats (1) onto the slanted surface (17).

16. The method for producing a skiing slope specialized for artificial skis, according to claim 15, wherein the predetermined space (10) is set so that, when ambient temperature is changed from a room temperature by about 25° C., a lower edge of an upper mat group (9) is brought into contact with an upper edge of a lower mat group (9).

* * * * *

UNITED STATES PATENT AND TRADEMARK OFFICE
CERTIFICATE OF CORRECTION

PATENT NO. : 5,647,804
DATED : July 15, 1997
INVENTOR(S) : Akira Homma, Susumu Homma, Hiroshi Sato and Hisao Hiroi It is certified that error appears in the above-identified patent and that said Letters Patent is hereby corrected as shown below:

Column 4, line 19, after "step;" insert --and--;

line 53, after "step;" insert --and-- line 61, before "described" insert --methods--;

line 63, delete "about,", insert --about 25°C--.

Column 6, line 29, delete "at," and insert --at the--;

line 41, delete "serves" and insert --serve--.

line 42, after "in" insert --its--.

Column 7, line 14, after "2.1 x $10^6$", insert --kg/cm$^2$--.

Column 8, line 3, delete "surfaces", and insert --surface--;

line 37, after "mats 1", insert --,--;

line 58, delete "will".

line 58, after "to", insert --easily--.

UNITED STATES PATENT AND TRADEMARK OFFICE
CERTIFICATE OF CORRECTION

PATENT NO. : 5,647,804
DATED : July 15, 1997
INVENTOR(S) : Akira Homma, Susumu Homma, Hiroshi Sato and Hisao Hiroi It is certified that error appears in the above-identified patent and that said Letters Patent is hereby corrected as shown below:

Column 10, line 16, (see claim 1) delete "(7)" and insert --(17)--.
Column 12, line 21, (see claim 12) delete "8", and insert --11--.

Signed and Sealed this

Twentieth Day of January, 1998

BRUCE LEHMAN

Attest:

Attesting Officer

Commissioner of Patents and Trademarks